Patented Jan. 31, 1928.

1,657,723

UNITED STATES PATENT OFFICE.

ERNEST HARRY RODD AND REGINALD WILLIAM EVERATT, OF BLACKLEY, MANCHESTER, ENGLAND, ASSIGNORS TO BRITISH DYESTUFFS CORPORATION LIMITED, OF MANCHESTER, LANCASHIRE, ENGLAND.

MANUFACTURE OF DINITROTOLUENE.

No Drawing. Application filed December 8, 1926, Serial No. 153,456, and in Great Britain May 12, 1926.

For certain purposes, in the explosives industry, dinitrotoluenes are required which will remain liquid at low temperatures, that is, below 20° C. It is known that mixed dinitrotoluenes of low setting point can be obtained by nitrating in known manner mixtures of mononitrotoluenes containing between 45 per cent and 85 per cent of metanitrotoluene (British Patent 17128 of 1913 to A. E. Verge U. S. Patent No. 1,124,496). Such mixtures are not, however, readily accessible industrially.

It has now been discovered that dinitrotoluene mixtures having setting points as low as −6 to −9° C., and therefore remaining liquid at all temperatures below +20° C. which come into practical consideration, can readily be obtained from commerical mononitrotoluene fractions containing less than 45 per cent of m-nitrotoluene, for example, from a fraction containing 33 per cent of m-nitrotoluene, 35 per cent of o-nitrotoluene and 32 per cent of p-nitrotoluene, although we do not confine our claim to this composition. The essential parts of our process consist:—

(a) in nitrating the particular fraction containing m-nitrotoluene, in known manner, to dinitrotoluene, and (b) in crystallizing the product at a convenient temperature to give a high setting point fraction, and a fraction the setting point of which lies between −10° C. and +20° C., according to the conditions under which crystallization is carried out.

The separation of the two fractions may be accomplished, for example, by centrifuging, draining, or by any other method for separating solids from liquids.

The optimum temperature at which the molten crude dinitrotoluene should be crystallized to give an oily product of the desired low setting-point must in general be determined by experiments; it depends on the proportion of meta isomeride in the mononitrotoluene nitrated, and also on the relative proportions of ortho- and para-isomerides present. If too high a crystallization temperature is used, an oil is obtained which slowly deposits crystals after a time. Oils having an apparent setting point above 20° C. generally desposit crystals slowly when kept at a temperature slightly above their setting point. The temperature of crystallization of the dinitrotoluene from the above-mentioned mononitrotoluene containing 33 per cent of meta isomeride must not exceed 25° C. in order to produce a satisfactory oil of setting point below 20° C. Starting from oils poorer in meta nitrotoluene we find that a lower crystallization temperature is necessary. The use of unduly low temperatures for crystallization results, of course, in a poor yield of oil.

Example I.

685 parts by weight of mixed mono-nitrotoluene containing 33 per cent meta-, 32 per cent para-, and 35 per cent ortho-nitrotoluene, are stirred and warmed to 40° C., and 1360 parts of a mixed acid containing 5.7 per cent $H_2O$, 24.3 per cent $HNO_3$, and 70 per cent $H_2SO_4$, are added at 40-50° C. during 3-4 hours. The whole is stirred at 55-60° C. for 3 hours longer, and the crude dinitrotoluenes separated in the usual manner and washed free from acid. The product is dried by heating at 80° C. for a few hours and is then allowed to crystallize with stirring at 18-20° C. for 24 hours. The resulting cream is then filtered or centrifuged and gives 380-430 parts of an oil of a setting point below 0° C. and 450-490 parts of a white solid of setting point 54-60° C.

Example II.

The nitration is carried out as above, but the crystallization is allowed to take place at 25° C. for 24 hours. The amount of oil obtained is about 500 parts, having a setting point of 18-20° C. The solid melts at 56-58° C.

What we claim and desire to secure by Letters Patent is:—

1. A process for the manufacture of dinitrotoluene having the property of remaining liquid at temperatures below 20° C. which consists in nitrating a mixture of mononitrotoluenes containing less than 45 per cent. of the meta isomeride, crystallizing the molten crude product of nitration, and separating the solid matter from the supernatant liquid, substantially as described.

2. A method of making dinitrotoluene of low setting point which comprises nitrating a mixture of mononitrotoluenes containing less than forty-five per cent of meta-mononitrotoluene to form dinitrotoluenes, separating the dinitrotoluenes from the acids, subjecting the so purified products to heat to dry the same, crystallizing the products to effect the formation of solid material and mother liquid, and separating the liquid from the solids by centrifuging to yield a dinitrotoluene having a setting point less than 20° C.

In testimony whereof we affix our signatures.

ERNEST HARRY RODD.
REGINALD WILLIAM EVERATT.